Figure 1:
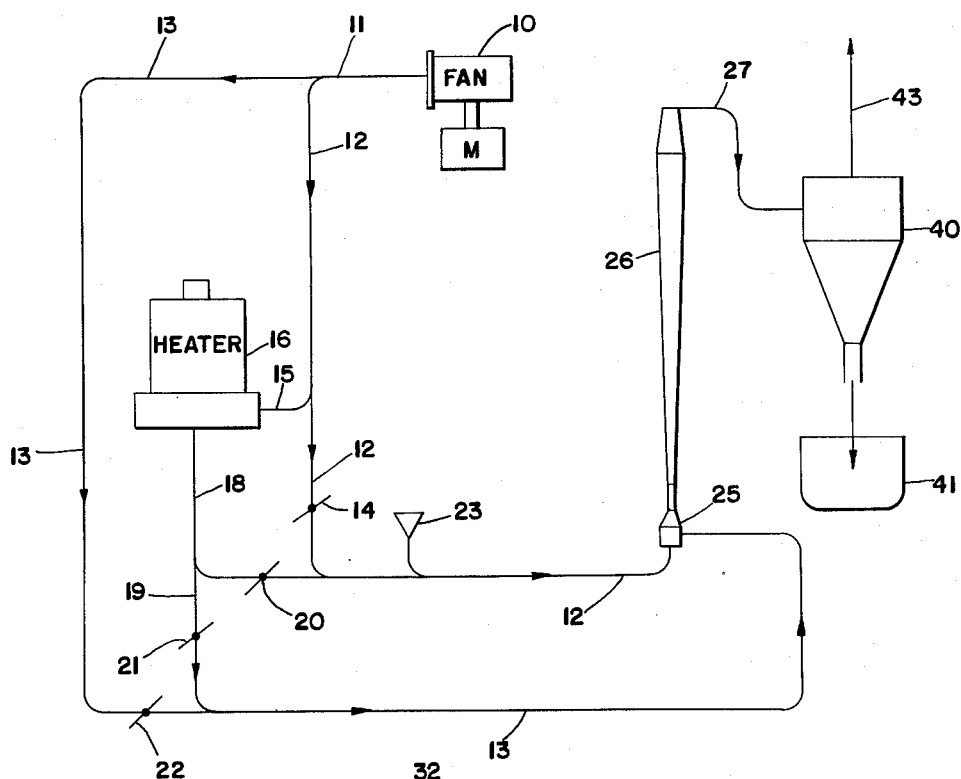

June 7, 1966 A. J. SCHREGENBERGER 3,254,420
METHOD AND APPARATUS FOR THE TREATMENT OF MOISTURE
CONTAINING MATERIALS IN GASEOUS STREAMS
Filed April 9, 1963

INVENTOR.
ALEX J. SCHREGENBERGER
BY
*Thomas L. Mayner*
ATTORNEY

United States Patent Office 3,254,420
Patented June 7, 1966

3,254,420
METHOD AND APPARATUS FOR THE TREATMENT OF MOISTURE CONTAINING MATERIALS IN GASEOUS STREAMS
Alex J. Schregenberger, Milltown, N.J., assignor to Midland-Ross Corporation, Cleveland, Ohio, a corporation of Ohio
Filed Apr. 9, 1963, Ser. No. 271,689
7 Claims. (Cl. 34—10)

This invention relates to improvements in a method and apparatus for treating flowable materials in gaseous streams and, more particularly, to a method and apparatus wherein moisture containing flowable materials are subjected to a drying treatment while being carried by a gaseous medium.

Generally, methods in use and those heretofore used in reducing moisture or liquid content of flowable materials did not sufficiently fully dry them in a single pass through a heated zone. Repeated passes were necessary or the moisture containing material was retained at a temperature for over a prolonged travel to effect removal of the moisture. These procedures, more often, did not produce an equal moisture removal from the various sized particles which generally form the material aggregate. The present method and apparatus advantageously subject the flowable medium to a high temperature sufficient to effect a quick removal of surface moisture without causing damage by burning, hardening or of imposing injurious effects, then to a lower temperature to vaporize inner moisture. All particles, whether of different shape or size and containing different amounts of moisture, are substantially equally dried when passed through the two temperature zones. An equal and controlled removal of moisture of various sized and shaped particles is, of course, desirable especially in the drying of pulp. Equally dried pulp subsequently results in fine, finished, uniform paper webbing.

The method of this invention generally subjects the moisture containing material at the point of injection into the gaseous stream to a high temperature, one providing for a high rate of vaporization, sometimes referred to as a condition of constant rate drying, where the drying rate is governed only by the heat transfer. The granulated pulp being wet at the point of injection is not hurt when subjected to the high temperatures since, so long as surface moisture is readily available, the temperature at the particle surface approaches the wet bulb temperature of the air. At about the point of travel in the conveying tube where the surface moisture has been vaporized, or removed, and which may be considered as taking place in a first zone, the temperature of the particle surface thereafter starts increasing approaching the dry bulb temperature of the air in which it is carried; then, just when such condition occus the material enters a second zone wherein the temperature is lower and the drying rate decreases since obviously the remaining moisture has to migrate to the particle surface before it can be evaporated and continuing initial high temperature would quickly damage the pulp.

As stated, in the second zone the temperature of the carrying gases is lower to prevent material damage and to remove the remaining moisture. In this second stage or zone, attempered air or gases moving vertically upward suspend the material being dried and, as the moisture is given up, the particles attain successively higher levels depending upon mass and retained moisture, until the desired final moisture content is reached and both air and material are removed to a cyclone separator.

Figure 2:
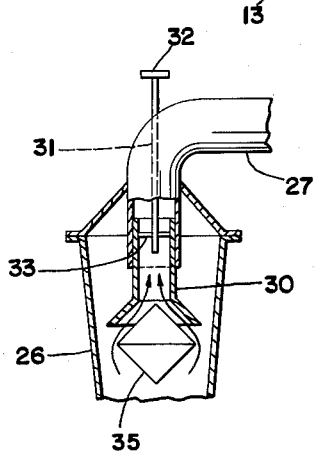

The method and apparatus will be better understood in the following detailed description taken in connection with the accompanying drawing, wherein:

FIGURE 1 is a diagrammatic representation of the gaseous matter conveying and drying system for moisture containing pulp; and FIGURE 2 represents in a partial detailed section a selective removal means of suspended dried material to an exhausting and separating means.

Referring to the drawing, gas such as air is supplied by driven fan 10 to a conveying tube 11 and therefrom to divergent take-off conveying tubes 12 and 13. The conveying tube 12 carries air to an interposed heater where it is raised in temperature to that required for high initial moisture removal from the surfaces of the pulp particles to be subsequently injected into the heated air stream. Air from tube 12 is diverted to the heater 16 through a connecting conveying tube 15 while the remainder is subject to further flow control through damper 14 for subsequent tempering of the heated air forwarded from the heater 16 through a tube 18 which joins the tube 12. Hot air coming from the heater 16 through the tube 18 is subject to control by interposed damper 20 through which it flows into the conveying tube 12. A further portion of the hot air from the heater 16 is diverted through a conveying tube section 19, through a controlling damper 21 into tube 13 which carries a diverted portion of the original cool air supply.

The material conveying air beyond the control dampers 14 and 20 in the tube 12 is of such high temperature designed so as to effect a quick, controlled and constant surface moisture removal off the wet particles while they pass in that portion or zone of the conveying tube 12. Starting from the point of particle injection hopper 23 into the tube 12 to the point where the air stream is redirected into the vertically positioned expanding cone 26 is an initial critical zone where the drying temperature is high, advantageously so because of existing surface moisture. Once this condition changes the temperature must be lowered to prevent damage.

The attempering air in the conveying tube 13 between the dampers 21, 22 and the cone base 25 is maintained at a certain desirable lowered temperature. Its relative dryness and controlled temperature further effect removal of moisture from within the particles when they are carried upwardly into the cone 26 comprising drying zone two and suspended therein on the upwardly thrusting air. Air from conveying tube 13 is directed into the base 25 of the vertically positioned reverse cone 26 at a tangent to the particle carrying air from conduit 12 which redirected the horizontal flow to one vertically upwardly so as to create a joined vortical flow, dispersing and scattering the pulp particles into an upwardly swirling gaseous stream. The particles find their elevation in the diverging tubular cone 26 from whence they are removed through the suspended tube 30 (see FIGURE 2) into the outgoing conveying tube 27 thence to a cyclone separator 40. Here the air is separated from the dried pulp air leaving in the direction of conduit 43 while the particles drop out by gravity into a collector 41.

The flowing particles within the conical tube 26 can be removed from various levels by an adjustment of flared withdrawing tube 30 relative to the cone 26 through an adjustment of threaded stem 31 working in a spider 33, which is securely fixed to the tube 30. The stem 31 is turned by a handle 32 to adjust the position of the flared withdrawing tube 30 and of the conoid 35, which is securely affixed (in any desirable manner) to the withdrawing tube 30, relative to the cone 26 and therethrough select the desired velocity of the particle bearing gas in the cone.

The method and apparatus herein described is utilizable in drying of many other materials than pulp. It is adapted to the drying of grains, certain vegetables, fruits, and various foodstuffs, organic matter in particle form as well as inorganic.

What is claimed is:

1. The method for removing moisture from flowable materials comprising, introducing moisture containing material into an unidirectional flowing gaseous stream to be carried thereby, subjecting the material suspended therein to an initial high temperature effecting constant rate drying, redirecting said gaseous material containing stream into a diverging vertical column meanwhile adding an attempering gas of lower temperature at about the column base, and diverting and collecting the upper floating material from said air column.

2. The method for removing moisture from flowable materials, comprising introducing moisture containing material into a generally straight line directed heated gaseous stream to be carried thereby and conducting it therein for a distance effecting initial substantial moisture removal, redirecting said gaseous material containing stream into a diverging vertical column meanwhile adding a dry and less heated tempering gas at the base of the column, said material being suspended in said column at a height depending on its mass and moisture loss, and diverting the topmost suspended material to a separator from which it is collected.

3. The method for removing moisture from flowable materials, comprising introducing moisture containing material into a generally straight line directed heated gaseous stream and conducting it therein for a distance effecting initial substantial moisture removal, redirecting said gaseous material containing stream into a diverging vertical column meanwhile tangentially adding a dry and less heated tempering gas at about the base of the column, said material being suspended in said column at a height depending on its mass and moisture loss, and diverting the topmost suspended material to a separator from whence it is collected.

4. The method for removing moisture from flowable materials, comprising introducing moisture containing material into a generally straight line directed heated gaseous stream and conducting it therein for a distance effecting initial substantial moisture removal, redirecting said gaseous material containing stream into a diverging vertical column meanwhle tangentially adding a dry and less heated tempering gas at about the base of the column, said material being suspended in said column at a height depending on its mass and moisture loss, and selectively diverting the suspended material to a separator from whence it is collected.

5. An apparatus for removing moisture from flowable materials comprising, a fan for supplying air under pressure, air conveying tubes joined the output of said air supply, a heater unit in one of said tubes for heating and forwarding air it receives, a conveying tube from said heater unit, means adding moisture containing flowable materials to said heated air conveying tube, said heated air material conveying tube being joined to a vertical diverging conical tube into which said air stream is directed, the other tube carrying air from said air supply adding said air at a tangent to the base of said conical tube creating a vortical flow therein, means for drawing off the top suspended material from within the conical tube, means for separating out the material from said drawn off air stream, and means for collecting the separated material.

6. An apparatus for removing moisture from flowable materials comprising, a fan for supplying air under pressure, air conveying tubes joined to the output of said air supply, a heater unit in one of said tubes for heating and forwarding a portion of the air it receives, the heated and unheated air flows being joined in one forwarding tube to which moisture containing material is added, means adding moisture containing material to said flowing air stream, a vertical diverging conical tube into which said material laden stream is directed, said material laden stream flowing upwardly and expandedly therein, an air conveying tube carrying air from said supply connected to the conical tube base adding said air at a tangent to the base of said conical tube creating a vortical flow therein, means for drawing off the top suspended material from within the conical tube, means for separating out the material from the drawn off air, and means for collecting the separated material.

7. An apparatus for removing moisture from flowable materials comprising, a fan for supplying air under pressure, air conveying tubes joined to said air supply, a heater unit in one of said tubes for heating and forwarding a portion of the air it receives, the heated and by-pass air flows being joined in one forwarding tube to which moisture containing material is added, means adding moisture containing material to said flowing air stream, a vertical diverging conical tube into which said material laden stream is directed, said material laden stream flowing upwardly and expandedly therein, a bypass for heated air from said heater, an air conveying tube carrying air from said air supply, said hot-air by-pass being connected to said second tube attempering the flowing air in the tube, said second tube being connected at a tangent to the base of said conical tube creating a vortical flow therein, means for drawing off the top suspended material from within the conical tube, means for separating out the material from the drawn off air, and means for collecting the separated material.

References Cited by the Examiner

UNITED STATES PATENTS

| | | | |
|---|---|---|---|
| 1,912,910 | 6/1933 | Neuman et al. | 34—10 X |
| 2,054,441 | 9/1936 | Peebles | 159—4 |
| 2,118,252 | 5/1938 | Krafft | 34—10 X |
| 2,363,281 | 11/1944 | Arnold. | |
| 2,559,551 | 7/1951 | Weber | 34—10 X |
| 3,078,588 | 2/1963 | Mark | 34—57 |

FOREIGN PATENTS

| | | |
|---|---|---|
| 418,462 | 10/1934 | Great Britain. |
| 463,060 | 3/1937 | Great Britain. |

WILLIAM F. O'DEA, *Primary Examiner.*

NORMAN YUDKOFF, *Examiner.*

J. SOFER, *Assistant Examiner.*